(12) United States Patent
Ishii et al.

(10) Patent No.: US 8,193,296 B2
(45) Date of Patent: Jun. 5, 2012

(54) GOLF BALLS INCLUDING CROSSLINKED THERMOPLASTIC POLYURETHANE

(75) Inventors: Hideyuki Ishii, Portland, OR (US); Hsin Cheng, Yun-lin Hsien (TW); Chien-Hsin Chou, Yun-lin Hsien (TW); Chung-Yu Huang, Tainan County (TW); Yasushi Ichikawa, Tualatin, OR (US); Chen-Tai Liu, Yun-lin Hsien (TW)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 12/827,360

(22) Filed: Jun. 30, 2010

(65) Prior Publication Data

US 2012/0004052 A1 Jan. 5, 2012

(51) Int. Cl.
*A63B 37/12* (2006.01)
*A63B 37/00* (2006.01)
*C08G 18/67* (2006.01)
*C08G 18/86* (2006.01)

(52) U.S. Cl. .............. 528/75; 528/65; 528/66; 522/162; 525/455; 473/374; 473/376; 473/378

(58) Field of Classification Search .................. None
See application file for complete search history.

(56) References Cited

U.S. PATENT DOCUMENTS

| | | | |
|---|---|---|---|
| 3,402,148 A | 9/1968 | Sutker et al. | |
| 3,457,324 A | 7/1969 | Sekmakas | |
| 3,557,249 A | 1/1971 | Dannels et al. | |
| 3,703,498 A | 11/1972 | Harris | |
| 3,714,092 A | 1/1973 | Mazzeo et al. | |
| 3,779,995 A | 12/1973 | Dannels et al. | |
| 4,151,153 A | 4/1979 | Ashcroft et al. | |
| 5,095,069 A | 3/1992 | Ambrose et al. | |
| 5,919,600 A | 7/1999 | Huang et al. | |
| 6,180,181 B1 | 1/2001 | Verardi et al. | |
| 6,284,840 B1 | 9/2001 | Rajagopalan et al. | |
| 6,358,161 B1 | 3/2002 | Aoyama | |
| 6,435,986 B1 | 8/2002 | Wu et al. | |
| 6,476,176 B1 | 11/2002 | Wu | |
| 6,582,326 B2 | 6/2003 | Wu et al. | |
| 6,635,716 B2 | 10/2003 | Voorheis et al. | |
| 6,835,794 B2 | 12/2004 | Wu et al. | |
| 7,163,472 B2 | 1/2007 | Dalton et al. | |
| 7,214,738 B2 | 5/2007 | Wu et al. | |
| 7,226,368 B2 | 6/2007 | Cavallaro et al. | |
| 7,358,294 B2 | 4/2008 | Buckmann et al. | |
| 7,402,649 B2 | 7/2008 | Kuntimaddi | |
| 7,417,107 B2 | 8/2008 | Rajagopalan et al. | |
| 2002/0160863 A1 | 10/2002 | Wu et al. | |
| 2003/0064826 A1 | 4/2003 | Voorheis et al. | |
| 2003/0096936 A1 | 5/2003 | Wu et al. | |
| 2003/0114247 A1 | 6/2003 | Cavallaro et al. | |
| 2004/0014922 A1 | 1/2004 | Buckmann et al. | |
| 2004/0097653 A1* | 5/2004 | Kim et al. | 525/130 |
| 2004/0198537 A1 | 10/2004 | Dalton et al. | |
| 2004/0209708 A1 | 10/2004 | Bulpett et al. | |
| 2005/0009642 A1 | 1/2005 | Wu et al. | |
| 2006/0009309 A1 | 1/2006 | Rajagopalan et al. | |
| 2006/0030680 A1 | 2/2006 | Kuntimaddi | |
| 2006/0040767 A1 | 2/2006 | Cavallaro et al. | |
| 2006/0189413 A1* | 8/2006 | Boehm et al. | 473/371 |
| 2008/0051233 A1 | 2/2008 | Nesbitt et al. | |
| 2009/0004396 A1 | 1/2009 | Wu et al. | |
| 2009/0023515 A1* | 1/2009 | Tarao | 473/371 |
| 2009/0197000 A1 | 8/2009 | Limerkens et al. | |
| 2009/0286624 A1 | 11/2009 | Petrichko et al. | |
| 2009/0286625 A1 | 11/2009 | Petrichko et al. | |
| 2010/0331113 A1* | 12/2010 | Shiga et al. | 473/374 |
| 2011/0186329 A1* | 8/2011 | Makal et al. | 174/113 R |

FOREIGN PATENT DOCUMENTS

| | | |
|---|---|---|
| BE | 671672 | 2/1966 |
| BE | 742824 | 6/1970 |
| BE | 786479 | 11/1972 |
| CA | 987831 | 4/1976 |
| CA | 2040280 | 3/1992 |
| CA | 2350631 | 6/2000 |
| CA | 2653658 | 12/2007 |
| CN | 1105030 | 4/2003 |
| CN | 1817934 | 8/2006 |
| CN | 100475874 | 4/2009 |
| CN | 101466755 | 6/2009 |
| DE | 2237614 | 3/1973 |
| DE | 10004499 | 8/2001 |
| EP | 473169 A2 | 3/1992 |
| EP | 1011984 | 3/2002 |
| EP | 1328563 | 7/2003 |
| EP | 1140378 | 8/2003 |
| ES | 2205936 | 5/2004 |
| FR | 1418816 | 11/1965 |

(Continued)

OTHER PUBLICATIONS

Thain; Science and Golf IV; 2002; pp. 320-327.*

(Continued)

*Primary Examiner* — David Buttner
(74) *Attorney, Agent, or Firm* — Plumsea Law Group, LLC (57) ABSTRACT

This disclosure relates to golf balls made from a crosslinked thermoplastic polyurethane elastomer. The crosslinked thermoplastic polyurethane elastomer includes crosslinks located in the hard segments, where the crosslinks being the reaction product of unsaturated bonds located in the hard segments as catalyzed by a free radical initiator. The crosslinks may be formed from an unsaturated diol as a chain extender. The unsaturated diol may be trimethylolpropane monoallylether (TMPME). The golf ball may include the crosslinked thermoplastic polyurethane elastomer in the cover layer, in which case the cover layer may exhibit a high degree of scuff resistance.

22 Claims, 1 Drawing Sheet

FOREIGN PATENT DOCUMENTS

| | | |
|---|---|---|
| FR | 1531115 | 6/1968 |
| FR | 2027306 | 9/1970 |
| FR | 2061490 | 6/1971 |
| GB | 997393 | 7/1965 |
| GB | 1032873 | 6/1966 |
| GB | 1270354 | 4/1972 |
| GB | 1304858 | 1/1973 |
| GB | 1304859 | 1/1973 |
| GB | 1305368 | 1/1973 |
| GB | 1395773 | 5/1975 |
| JP | 49021119 | 5/1974 |
| JP | 11152406 | 6/1999 |
| JP | 2002268220 | 9/2002 |
| JP | 2006091485 | 4/2006 |
| JP | 2006255706 | 9/2006 |
| JP | 2007007427 | 1/2007 |
| JP | 2008179812 | 8/2008 |
| JP | 2009022465 | 2/2009 |
| KR | 2009031566 | 3/2009 |
| MX | 2008015944 | 1/2009 |
| NL | 6919533 | 7/1970 |
| NL | 7211104 | 2/1973 |
| WO | 9911467 | 3/1999 |
| WO | 9952604 | 10/1999 |
| WO | 9961113 | 12/1999 |
| WO | 0035600 | 6/2000 |
| WO | 0232980 | 4/2002 |
| WO | 2007144292 | 12/2007 |
| WO | 2009002783 | 12/2008 |

OTHER PUBLICATIONS

Office Action mailed Feb. 23, 2011 for Canadian Patent Application No. 2,708,471.

Prior Art Search Report as written by the Korean Institute of Patent Information on Sep. 30, 2010 in Korean Patent Application No. 10-2010-0091609, with certified English translation.

Extended European Search Report dated Oct. 21, 2011 in European Patent Application No. EP10172272.

* cited by examiner

GOLF BALLS INCLUDING CROSSLINKED THERMOPLASTIC POLYURETHANE

BACKGROUND OF THE INVENTION

1. Field of the Invention

The present invention relates to golf balls and their manufacture, and in particular to golf balls having thermoplastic polyurethane covers.

2. Description of Related Art

Golf ball covers are generally divided into two types: thermoplastic covers and thermoset covers. Thermoplastic polymer materials may be reversibly melted, and so may be used in a variety of manufacturing techniques such as compression molding that take advantage of this property. On the other hand, thermoset polymer materials are generally formed by mixing two or more components to form a cured polymer material that cannot be re-melted or re-worked. Each type of polymer material present advantages and disadvantages when used to manufacture golf balls.

Thermoplastic materials for golf ball covers may include ionomer resin, highly neutralized acid polymer composition, polyamide resin, polyester resin, polyurethane resin, and mixtures thereof. Among these, ionomer resin and polyurethane resin are popular materials for golf ball covers.

Ionomer resins, such as Surlyns® (commercially available from E.I. DuPont de Nemours and Company), have conventionally been used for golf ball covers. For example, Dunlop Rubber Company obtained the first patent on the use of Surlyn® for the cover of a golf ball, U.S. Pat. No. 3,454,280 issued Jul. 8, 1969. Since then, there have been a number of disclosures on the use of ionomer resins in the cover composition of a golf ball, for example, U.S. Pat. Nos. 3,819,768, 4,323,247, 4,526,375, 4,884,814 and 4,911,451.

However, ionomer resin covered golf balls suffer from the problem that the cover surface may be scraped off by grooves on a clubface during repeated shots, particularly with irons. In other words, ionomer covers have poor scuff resistance. Also, ionomer covered balls usually have inferior spin and feel properties as compared to balata rubber or polyurethane covered balls. The use of softer ionomer resins for the cover will improve spin and feel to some extent, but will also compromise the resilience of the golf balls because such balls usually have a lower coefficient of restitution (C.O.R.). Furthermore, the scuff resistance of such softer ionomer covers is often still not satisfactory.

Thermoplastic polyurethane elastomers may also be used as the cover material, as described in (for example) U.S. Pat. Nos. 3,395,109, 4,248,432 and 4,442,282. However, the thermoplastic polyurethane elastomers disclosed therein do not satisfy all the requirements of moldability, hitting feel, control, resilience, and scuff resistance upon iron shots.

On the other hand, thermoset polymer materials such as polyurethane elastomers, polyamide elastomers, polyurea elastomers, diene-containing polymer, crosslinked metallocene catalyzed polyolefin, and silicone, may also be used to manufacture golf balls. Among these materials, thermoset polyurethane elastomers are popular.

Many attempts, such as are described in U.S. Pat. Nos. 3,989,568, 4,123,061, 5,334,673, and 5,885,172, have been made to use thermoset polyurethane elastomers as a substitute for balata rubber and ionomer resins. Thermosetting polyurethane elastomers are relatively inexpensive and offer good hitting feel and good scuff resistance. Particularly, thermoset polyurethane elastomers may present improvements in the scuff resistance as compared to softened ionomer resin blends. However, thermoset materials require complex manufacturing processes to introduce the raw material and then effect a curing reaction, which causes the manufacturing process to be less efficient.

Accordingly, for the foregoing reasons, there is a need to develop a golf ball cover material with good scuff resistance that can be efficiently manufactured. There is a need in the art for a system and method that addresses the shortcomings of the prior art discussed above.

SUMMARY OF THE INVENTION

In one aspect, this disclosure provides a golf ball comprising: a crosslinked thermoplastic polyurethane elastomer; the crosslinked thermoplastic polyurethane elastomer including hard segments and soft segments; wherein the crosslinked thermoplastic polyurethane elastomer includes crosslinks located in the hard segments, the crosslinks being the reaction product of unsaturated bonds located in the hard segments as catalyzed by a free radical initiator.

In a particular embodiment of the above golf ball, this disclosure provides a golf ball wherein the crosslinked thermoplastic polyurethane elastomer includes crosslinks formed from allyl ether side groups, and the crosslinked thermoplastic polyurethane elastomer is the reaction product formed from reacting an organic isocyanate with a mixture of the following reactants: (a) an unsaturated diol, having two primary hydroxyl groups and at least one allyl ether side group, of the formula in which R is alkyl group with or without modified functional groups, and x and y are integers of 1 to 4; (b) a chain extender, having at least two reaction sites with isocyanates and having a molecular weight of less than about 450; (c) a long chain polyol having a molecular weight of between about 500 and about 4,000; and (d) a sufficient degree of free radical initiator, so as to be capable of generating free radicals that induce crosslinking structures in the hard segments by free radical initiation.

In another aspect, the present disclosure provides a golf ball comprising: an inner core layer, an outer core layer substantially surrounding the inner core layer, an inner cover layer substantially surrounding the outer core layer, and an outer cover layer substantially surrounding the inner cover layer; wherein the outer cover layer comprises a crosslinked thermoplastic polyurethane elastomer having crosslinks located in hard segments, the crosslinks being the reaction product of unsaturated bonds located in the hard segments as catalyzed by a free radical initiator; and the golf ball satisfies the following requirements: (1) the golf ball has a compression deformation of from about 2 to about 4 millimeters under a load of 10 to 130 kilograms; (2) the inner core layer has a coefficient of restitution at 40 meters per second from about 0.79 to about 0.92, the coefficient of restitution of the inner core being higher than that of the golf ball; (3) the outer cover layer has a Shore D hardness from about 20 to about 75; and (4) the outer cover layer has a flexural modulus of from about 1 kpsi to about 150 kpsi.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Generally, this disclosure provides golf balls manufactured from a crosslinked thermoplastic polyurethane, where the crosslinks are formed in the hard segments. Any layer of the golf ball may be made from the crosslinked thermoplastic polyurethane, and in particular embodiments the cover is made from the crosslinked thermoplastic polyurethane. As a result of these particular crosslinks, the cover's scuff resistance may be greatly improved.

Except as otherwise discussed herein below, any golf ball discussed herein may generally be any type of golf ball known in the art. Namely, unless the present disclosure indicates to the contrary, a golf ball may generally be of any construction conventionally used for golf balls, and may be made of any of the various materials known to be used in golf ball manufacturing.

Figure 1:
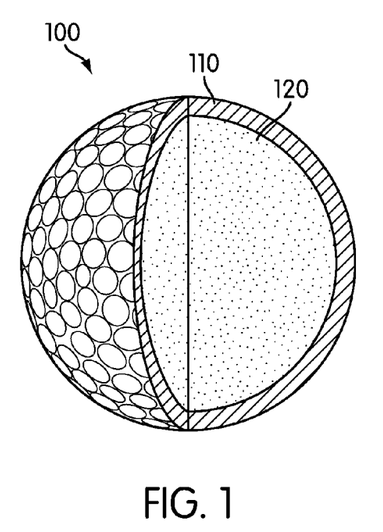
FIG. 1 shows a representative golf ball in accordance with this disclosure, the golf ball being of a two-piece construction.

FIG. 1 shows a golf ball 100 in accordance with a first embodiment of the present disclosure. Golf ball 100 is a two piece golf ball. Specifically, golf ball 100 includes cover layer 110 substantially surrounding core 120. In golf ball 100, either or both of cover 110 or core 120 may be made of a crosslinked thermoplastic polyurethane elastomer. In particular embodiments, cover 110 comprises the crosslinked thermoplastic polyurethane elastomer.

The crosslinked thermoplastic polyurethane elastomer may include hard segments and soft segments, as thermoplastic polyurethanes are known to include. Thermoplastic polyurethanes are generally made up of (1) a long chain polyol, (2) a relatively short chain extender, and (3) a diisocyanate. Once reacted, the portions of the polymer chain made up of the chain extender and diisocyanate generally align themselves into semi-crystalline structures through weak (i.e., non-covalent) association, such as through Van der Waals forces, dipole-dipole interactions or hydrogen bonding. These portions are commonly referred to as the hard segments, because the semi-crystalline structure is harder than the amorphous portions made up of the long chain polyol.

The crosslinked thermoplastic polyurethane may include crosslinks located specifically in the hard segments. These crosslinks may be the reaction product of unsaturated bonds located in the hard segments, as catalyzed by a free radical initiator. These unsaturated bonds may be introduced into the hard segments by the use of unsaturated diols as chain extenders. In particular embodiments, the crosslinks may be formed from allyl ether side groups present in the hard segments.

In specific embodiments, the crosslinked thermoplastic polyurethane elastomer may be derived from reacting an organic isocyanate with a mixture of:

(a) an unsaturated diol, having two primary hydroxyl groups and at least one allyl ether side group, of the formula in which R is alkyl group with or without modified functional groups, and x and y are integers of 1 to 4;

(b) a chain extender, having at least two reaction sites with isocyanates and having a molecular weight of less than about 450;

(c) a long chain polyol having a molecular weight of between about 500 and about 4,000; and (d) a sufficient degree of free radical initiator, so as to be capable of generating free radicals that induce crosslinking structures in the hard segments by free radical initiation.

Each of the above listed reactants will be discussed in further detail, with the understanding that any particular embodiment of a specific reactant may be mixed and matched with any other specific embodiment of another reactant according to the general formulation above. Furthermore, any reactant may generally be used in combination with other reactants of the same type, such that any list herein may be assumed to include mixtures thereof, unless otherwise specified.

The organic isocyanate may include any of the known aromatic, aliphatic, and cycloaliphatic di- or polyisocyanates. Examples of suitable isocyanates include: 2,2'-, 2,4'- (and particularly) 4,4-diphenylmethane diisocyanate, and isomeric mixtures thereof; polyphenylene polymethylene polyisocyanates (poly-MDI, PMDI); 2,4- and 2,6-toluene diisocyanates, and isomeric mixtures thereof such as an 80:20 mixture of the 2,4- and 2,6-isomers; the saturated, isophorone diisocyanate; 1,4-diisocyanatobutane; 1,5-diisocyanatopentane; 1,6-diisocyanatohexane; 1,4-cyclohexane diisocyanate; cycloaliphatic analogs of PMDI; and the like.

Suitable chain extenders may include the common diols, such as ethylene glycol, diethylene glycol, triethylene glycol, propylene glycol, dipropylene glycol, tripropylene glycol, 1,3-propanediol, 1,4-butanediol, 1,6-hexanediol, 1,10-decanediol, neopentyl glycol, dihydroxyethoxy hydroquinone, 1,4-cyclo-hexanedimethanol, 1,4-dihydroxycyclohexane, and the like. Minor amounts of crosslinking agents such as glycerine, trimethylolpropane, diethanolamine, and triethanolamine may be used in conjunction with the diol chain extenders.

In addition to the common diol chain extenders, diamines and amino alcohols may also be used. Examples of suitable diamines include aliphatic, cyclolaliphatic or aromatic diamines. In particular, a diamine chain extender may be ethylene diamine, hexamethylene diamine, 1,4-cyclohexyene diamine, benzidine, toluene diamine, diaminodiphenyl methane, the isomers of phenylene diamine or hydrazine. Aromatic amines may also be used, such as MOCA (4,4'-methylene-bis-o-chloroaniline), M-CDEA (4,4'-methylenebis(3-chloro-2-6-diethyl-laniline)). Examples of suitable amino alcohols are ethanol amine, N-methylethanolamine, N-butylethanolamine, N-oleyethanolamine, N-cyclohexyl-isopropanolamine, and the like. Mixtures of various types of chain extenders may also be used to form the crosslinked thermoplastic polyurethane.

The long chain polyol ("the polyol") may generally be a polyester polyol or a polyether polyol. Accordingly, the crosslinked thermoplastic polyurethane may be either general type of polyurethane: a polyether based polyurethane elastomer or a polyester based polyurethane elastomer, or mixtures thereof.

The long chain polyol may be a polyhydroxy compound having a molecular weight between 500 and 4,000. Suitable long chain polyols may generally include linear polyesters, polyethers, polycarbonates, polylactones (e.g., $\epsilon$-caprolactone), and mixtures thereof. In addition to polyols having hydroxyl terminal groups, the polyol may include carboxyl, amino or mercapto terminal groups.

Polyesters polyols are produced by the reaction of dicarboxylic acids and diols or esterifiable derivative thereof. Examples of suitable dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. Examples of suitable diols include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, and the like. Both of the dicarboxylic acids and diols can be used individually or in mixtures to make specific polyesters in the practice applications.

Polyether polyols are prepared by the ring-opening addition polymerization of an alkylene oxide with an initiator of a polyhydric alcohol. Examples of suitable polyether polyols are polypropylene glycol (PPG), polyethylene glycol (PEG), polytetramethylene ether glycol (PTMEG). Block copolymers such as combinations of polyoxypropylene and polyoxyethylene glycols, poly-1,2-oxybutylene and polyoxyethylene glycols, poly-1,4-tetramethylene and polyoxyethylene glycols are also preferred in the present invention.

Polycarbonate polyols are made through a condensation reaction of diols with phosgene, chloroformic acid ester, dialkyl carbonate or diallyl carbonate. Examples of diols in the suitable polycarbonate polyols of the crosslinked thermoplastic polyurethane elastomers are ethanediol, diethylene glycol, 1,3-butanediol, 1,4-butanediol, 1,6-hexanediol, neopentylglycol, and 1,5-pentanediol.

The crosslinked thermoplastic polyurethane elastomer may comprise a sufficient degree of free radical initiator so as to be capable of inducing crosslinking structures in the hard segments by free radical initiation. The free radical initiator may generate free radicals through thermal cleavage or UV radiation. When the half-life of the free radical initiator and its operation temperature are considered in the manufacturing process, the weight ratio of initiators to unsaturated diols may be from 0.1:100 to 100:100. In particular embodiments, the weight ratio of free radical initiator to unsaturated diols may be about 5:100.

A variety of known free radical initiators may be used as the radical source in order to make the present polyurethane elastomer having a crosslinking structure. Suitable radical initiators may include peroxides, sulfurs, and sulfides, and peroxides may be particularly suitable in some embodiments. The peroxides may be aliphatic peroxides or and aromatic peroxides, or mixtures thereof. Aromatic peroxides, such as diacetylperoxide, di-tert-butypperoxide, dicumylperoxide, dibenzoylperoxide, 2,5-dimethyl-2,5-di(benzoylperoxy) hexane, 2,5-dimethyl-2,5-di(butylperoxy)-3-hexyne, 2,5-bis-(t-butylperoxy)-2,5-dimethyl hexane, n-butyl-4,4-bis(t-butylperoxyl)valerate, 1,4-bis-(t-butylperoxyisopropyl)-benzene, t-butyl peroxybenzoate, 1,1-bis-(t-butylperoxy)-3,3,5 tri-methylcyclohexane, and di(2,4-dichloro-benzoyl) may be used as the free radical initiator in some embodiments.

The unsaturated diol may generally be any diol having at least one unsaturated bond. As is generally known, an unsaturated bond may be a double bond between two carbon atoms (as in an alkene) or a triple bond (as in an alkyne). In particular embodiments, the unsaturated diol may have two primary alcohol groups. The presence of two primary alcohol groups may result in favorable reaction kinetics, such that the crosslinked thermoplastic polyurethane may be formed in an easily controlled "one step" continuous process.

In particular embodiments, the unsaturated diol may have two primary hydroxyl groups and at least one allyl ether side group, so as to be of the formula:

(1)

in which R is alkyl group with or without modified functional groups, and x and y are integers of 1 to 4. In particular embodiments, x and y may both have values of 1, 2, 3 or 4. In other embodiments, x and y may each have different values of between 1 and 4.

In one particular embodiment, the unsaturated diol may be trimethylolpropane monoallylether ("TMPME"). TMPME may also be named "trimethylol propane monoallyl ether", "trimethylol propane monoallylether", or "trimethylolpropane monoallyl ether." TMPME has CAS no. 682-11-1. TMPME may also be referred to as 1,3-Propanediol, 2-ethyl-2-[(2-propen-1-yloxy)methyl] or as 2-allyloxymethyl-2-ethyl-1,3-propanediol. TMPME is commercially available from Perstorp Specialty Chemicals AB.

Other suitable compounds that may be used as the unsaturated diol of formula (1) may include: 1,3-Propanediol, 2-(2-propen-1-yl)-2-[(2-propen-1-yloxy)methyl]; 1,3-Propanediol, 2-methyl-2-[(2-propen-1-yloxy)methyl]; 1,3-Propanediol, 2,2-bis[(2-propen-1-yloxy)methyl; and 1,3-Propanediol, 2-[(2,3-dibromopropoxy)methyl]-2-[(2-propen-1-yloxy)methyl]. Further compounds within the scope of formula (1) may be known to a person having ordinary skill in the art, and may be used in the present disclosure.

The weight ratio of crosslinked thermoplastic polyurethane elastomer to the unsaturated diols may generally be from about 100:0.1 to about 100:25. In particular embodiments, the weight ratio of crosslinked thermoplastic polyurethane elastomer to the unsaturated diols may be about 100:10. Furthermore, the NCO index of the reactants making up the crosslinked thermoplastic polyurethane elastomer may be from about 0.9 to about 1.3. As is generally known, the NCO index is the molar ratio of isocyanate functional groups to active hydrogen containing groups. In particular embodiments, the NCO index may be about 1.0.

Optionally, the crosslinked thermoplastic polyurethane elastomer may include further components such as fillers and/or additives. Fillers and additives may be used based on any of a variety of desired characteristics, such as enhancement of physical properties, UV light resistance, and other properties. For example, to improve UV light resistance, the crosslinked thermoplastic polyurethane elastomer may include at least one light stabilizer. Light stabilizers may include hindered amines, UV stabilizers, or a mixture thereof.

Inorganic or organic fillers can be also added to the crosslinked thermoplastic polyurethane elastomer. Suitable inorganic fillers may include silicate minerals, metal oxides, metal salts, clays, metal silicates, glass fibers, natural fibrous minerals, synthetic fibrous minerals or a mixture thereof. Suitable organic fillers may include carbon black, fullerene and/or carbon nanotubes, melamine colophony, cellulose fibers, polyamide fibers, polyacrylonitrile fibers, polyurethane fibers, polyester fibers based on aromatic and/aliphatic dicarboxylic acid esters, carbon fibers or a mixture thereof. The inorganic and organic fillers may be used individually or as a mixture thereof. The total amount of the filler may be from about 0.5 to about 30 percent by weight of the polyurethane components.

Flame retardants may also be used to improve the flame resistance of the crosslinked thermoplastic polyurethane elastomer. Suitable flame retardants may include organic phosphates, metal phosphates, metal polyphosphates, metal oxides (such as aluminum oxide hydrate, antimony trioxide, arsenic oxide), metal salts (such as calcium sulfate, expandable graphite), and cyanuric acid derivatives (such as melamine cyanurate). These flame retardants may be used individually or as a mixture thereof, and the total amount of the flame retardant may be from about 10 to about 35 percent by weight of the polyurethane components.

To improve toughness and compression rebound, the crosslinked thermoplastic polyurethane elastomer may include at least one dispersant, such as a monomer or oligomer comprising unsaturated bonds. Examples of suitable monomers include styrene, acrylic esters; suitable oligomers include di- and tri-acrylates/methacrylates, ester acrylates/methacrylates, urethane or urea acrylates/methacrylates.

If the outermost layer of a golf ball comprises the crosslinked thermoplastic polyurethane elastomer, then the crosslinked thermoplastic polyurethane elastomer may include at least one white pigment to aid in better visibility. The white pigment may be selected from the group consisting of titanium dioxide, zinc oxide or a mixture thereof.

The crosslinked thermoplastic polyurethane elastomer may generally be formed by a single-screw, twin-screw, or a batch method in order to mix and react all of the ingredients described above. The products of the reaction process may be in the form of pallets or grounded chips.

If a single-crew or twin-screw process is used, the dwell times of the molten reaction mixture in the screw extruder may generally be in the range of from about 0.3 to about 10 minutes, and in some embodiments may be from about 0.4 to about 4 minutes. The temperature of the screw housing may be in the range of about 70 degrees Celsius to 280 degrees Celsius. The melt leaving the extruder may be chilled and broken down into small pieces using any method for the following injection or extrusion applications.

If a batch method is used to form the crosslinked thermoplastic polyurethane elastomer, all the components are molten and mixed together with a high agitated stir at a temperature in the range of about 70 degrees Celsius to 120 degrees Celsius for about 1 to about 3 minutes. Subsequently, the mixture is subjected to a post curing process at a temperature in the range of about 70 degrees Celsius to 150 degrees Celsius for about 5 to about 18 hours. The products made by this batch method may be ground into the form of chips for an injection or extrusion application.

Figure 2:
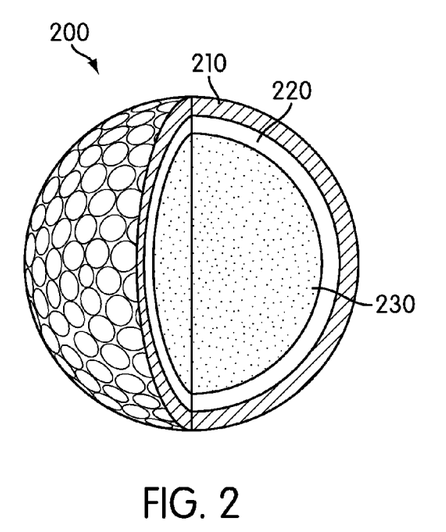
FIG. 2 shows a second representative golf ball, having an inner cover layer and an outer cover layer.

FIG. 2 shows a golf ball 200 in accordance with a second embodiment of the present disclosure. Golf ball 200 includes a core 230, an inner cover layer 220 substantially surrounding core 230, and an outer cover layer 210 substantially surrounding inner cover 220. Any layer of golf ball 200 may comprise the crosslinked thermoplastic polyurethane elastomer described above.

In some embodiments, both inner cover layer 220 and outer cover layer 210 comprise the crosslinked thermoplastic polyurethane elastomer. In other embodiments, either inner cover layer 220 or outer cover layer 210 comprises the crosslinked thermoplastic polyurethane elastomer. In still other embodiments, outer cover layer 210 in particular comprises the crosslinked thermoplastic polyurethane elastomer. In these embodiments, outer cover layer 210 may have a surface Shore D hardness of from about 20 to about 75, or from about 40 to about 65. Outer cover layer 210 may have a flexural modulus of about 1 to about 150 kpsi according to ASTM D790.

Figure 3:
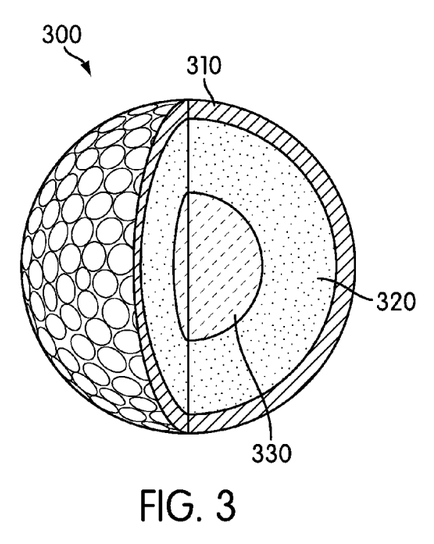
FIG. 3 shows a third representative golf ball, having an inner core and an outer core.

FIG. 3 shows a golf ball 300 in accordance with a third embodiment of the present disclosure. Golf ball 300 includes an inner core layer 330, an outer core layer 320 substantially surrounding inner core layer 330, and a cover layer 310 substantially surrounding outer core layer 320. Any layer of golf ball 300 may include the crosslinked thermoplastic polyurethane elastomer described above. In some embodiments, cover layer 310 comprises the crosslinked thermoplastic polyurethane elastomer. As with cover layer 210, cover layer 310 may have a surface Shore D hardness of from about 20 to about 75, or from about 40 to about 65. Cover layer 310 may also have a flexural modulus of from about 1 to about 150 kpsi according to ASTM D790.

Figure 4:
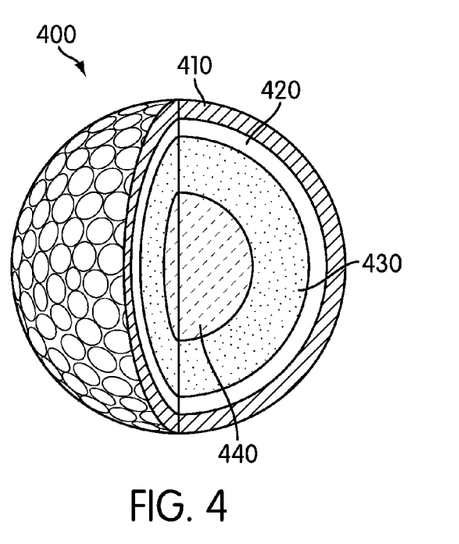
FIG. 4 shows a fourth representative golf ball, having an inner core, an outer core, an inner cover layer, and an outer cover layer.

FIG. 4 shows a golf ball 400 in accordance with a fourth embodiment of the present disclosure. Golf ball 400 includes an inner core layer 440, an outer core layer 430 substantially surrounding inner core layer 440, an inner cover layer 420 substantially surrounding outer core layer 430, and an outer cover layer 410 substantially surrounding inner cover layer 420. Any layer of golf ball 400 may include the crosslinked thermoplastic polyurethane elastomer described above.

In some embodiments, both inner cover layer 420 and outer cover layer 410 comprise the crosslinked thermoplastic polyurethane elastomer. In other embodiments, either inner cover layer 420 or outer cover layer 410 may include the crosslinked thermoplastic polyurethane elastomer. In specific embodiments, outer cover layer 410 comprises the crosslinked thermoplastic polyurethane elastomer. In such embodiments, outer cover layer 410 may have a surface Shore D hardness of from about 20 to about 75, or from about 40 to about 65. Outer cover layer 410 may also have a flexural modulus of 1 to 150 kpsi according to ASTM D790.

The construction of the golf ball according to the present disclosure is not limited to the aforementioned embodiments. A golf ball in accordance with this disclosure may generally take any construction, such as a regulation or non-regulation construction. Regulation golf balls are golf balls which meet the Rules of Golf as approved by the United States Golf Association (USGA).

The crosslinked thermoplastic polyurethane elastomer described variously above may be used to make golf balls by injection molding or compression molding. Injection molding may be used in particular embodiments in order to achieve increased productivity. Generally, the free radical initiator may be added to the polymer mixture at any of several stages during manufacturing. For example, the radical initiator may be added during extrusion of the polymer mixture, or during compression molding. Similarly, the free radical initiator may be activated so as to form crosslinks during any of several stages of manufacturing. For example, the free radical initiator may be activated by heating during an extrusion process.

For any ball layer(s) other than the layer(s) comprising the crosslinked thermoplastic polyurethane elastomer, suitable materials can be selected from any of the various materials known to be used in golf ball manufacturing. Specifically, such other materials may be selected from the following groups: (1) thermoplastic materials selected from the group consisting of ionomer resin, highly neutralized acid polymer composition, polyamide resin, polyester resin, polyurethane resin and a mixture thereof; or (2) thermoset materials selected from the group consisting of polyurethane elastomer, polyamide elastomer, polyurea elastomer, diene-containing polymer (such as polybutadiene), crosslinked metallocene catalyzed polyolefin, silicone, and a mixture thereof.

For example, in embodiments where the core construction is multilayered, the choice of the material making up the inner core layer 330 (as shown in FIG. 3) or inner core layer 440 (as shown in FIG. 4) is not particularly limited. The material making up inner core layer 330 or inner core layer 440 may be selected from the following groups: (1) thermoplastic materials selected from the group consisting of ionomer resin, highly neutralized acid polymer composition, polyamide resin, polyester resin, polyurethane resin and a mixture thereof; or (2) thermoset materials selected from the group consisting of polyurethane elastomer, polyamide elastomer, polyurea elastomer, diene-containing polymer (such as polybutadiene), crosslinked metallocene catalyzed polyolefin, silicone, and a mixture thereof.

Among the various thermoplastic and thermoset materials, ionomer resin or highly neutralized acid polymer composition may comprise inner core layer 330 or inner core layer 440 in particular embodiments. For example, Surlyn®, HPF 1000, HPF 2000, HPF AD1027, HPF AD1035, HPF AD1040 and a mixture thereof, all produced by E.I. Dupont de Nemours and Company may be used.

Inner core layer 330 or inner core layer 440 may be made by a fabrication method such as hot-press molding or injection molding. A diameter of inner core layer 330 or inner core layer 440 may be in a range of about 19 millimeters to about 37 millimeters, or in a range of about 21 millimeters to about 35 millimeters, or in a range of about 23 millimeters to about 32 millimeters. Inner core layer 330 or inner core layer 440 may have a surface Shore D hardness of 20 to 70.

In certain embodiments, if inner core layer 330 or inner core layer 440 is made from a thermoplastic material, then outer core layer 320 or outer core layer 430 may be made from a thermoset material. In particular, outer core layer 320 or outer core layer 430 may comprise polyurethane elastomer, polyamide elastomer, polyurea elastomer, diene-containing polymer (such as polybutadiene), crosslinked metallocene catalyzed polyolefin, silicone, and a mixture thereof. In particular embodiments, outer core layer 320 or outer core layer 430 may comprise polybutadiene.

In particular embodiments, a core layer may comprise 1,4-cis-polybutadiene in order to achieve superior resiliency performance. Specifically, 1,4-cis-polybutadiene may be used as a base material for outer core layer 320 or outer core layer 430, and mixed with other ingredients. Generally, however, 1,4-cis-polybutadiene may be at least 50 parts by weight, based on 100 parts by weight of the composition of the outer core layer 320 or outer core layer 430.

Other additives, such as a crosslinking agent and a filler with a greater specific gravity may further be added to the composition of the outer core layer 320 or outer core layer 430. Crosslinking agents may be selected from the group consisting of zinc diacrylate, magnesium acrylate, zinc methacrylate, and magnesium methacrylate. In particular embodiments, zinc acrylate may be used in order to achieve increased resilience.

To increase specific gravity, a suitable filler may be added in the rubber composition of the core layer. The filler may be zinc oxide, barium sulfate, calcium carbonate, and magnesium carbonate. Other fillers, such as a metal powder with a greater specific gravity may also be used, such as tungsten. By means of adjusting the amount of filler, the specific gravity of outer core layer 320 or outer core layer 430 may be controlled.

Finally, outer core layer 320 or outer core layer 430 may have a surface Shore D hardness of 30 to 75.

Alternatively, inner core layer 330 or inner core layer 440 may comprise the aforementioned thermoset material while outer core layer 320 or outer core layer 430 may comprise the thermoplastic material, or any combination thereof.

In embodiments where the core construction is multilayered, the C.O.R. of the inner core layer (such as inner core layer 330 in FIG. 3 and inner core layer 440 in FIG. 4) at forty (40) meters per second may be from about 0.79 to about 0.92, and may be higher than that of the golf ball as a whole. Also, the C.O.R. of the golf ball at forty (40) meters per second may be at least about 0.77.

After the final cover layer of the golf ball has been molded, the golf ball may undergo various conventional finishing processes such as buffing, stamping and painting. The finished golf ball may have a compression deformation of 2 to 4 millimeters under a load of 10 to 130 kilograms.

In particular embodiments, any of the various measured properties may be present in a golf ball according to this disclosure in any combination thereof. For example, a multi-part golf ball according to this disclosure may exhibit the following properties: (1) the golf ball has a compression deformation of from about 2 to about 4 millimeters under a load of 10 to 130 kilograms; (2) the inner core layer has a coefficient of restitution at 40 meters per second from about 0.79 to about 0.92, the coefficient of restitution of the inner core being higher than that of the golf ball; (3) the outer cover layer has a Shore D hardness from about 20 to about 75; and (4) the outer cover layer has a flexural modulus of from about 1 kpsi to about 150 kpsi.

EXAMPLES

Two golf balls in accordance with the present disclosure were fabricated as described below, and their scuff resistance was compared to several comparative examples.

For each golf ball, the core was made from a material selected from Table 1, and the cover layer was made from a material selected from Table 2. The amount of the materials listed in Tables 1 and 2 is shown in parts by weight (pbw) or percentages by weight.

TABLE 1

Core Materials

| Rubber compound: | A | B |
|---|---|---|
| TAIPOL ™ BR0150* | 100 | 100 |
| Zinc diacrylate | 28 | 25 |
| Zinc oxide | 5 | 5 |
| Barium sulfate | 16 | 18 |
| Peroxide | 1 | 1 |

TAIPOL™ BR0150 is the trade name of a rubber produced by Taiwan Synthetic Rubber Corp.

TABLE 2

Cover Materials

| | C | D | E | F | G | H | I |
|---|---|---|---|---|---|---|---|
| PTMEG (pbw) | 100 | 100 | 100 | 100 | | | |
| BG (pbw) | 15 | 15 | 15 | 15 | | | |
| TMPME (weight % to total components) | 10% | 10% | 0 | 10% | | | |
| DCP (weight % to total components) | 0.2% | 0.5% | 0 | 0 | | | |
| MDI (pbw) | 87.8 | 87.8 | 55.0 | 87.8 | | | |
| (NCO index) | 1.01 | 1.01 | 1.01 | 1.01 | | | |
| Texin ® 245 | | | | | 100 | | |
| Elastollan ® 1195A | | | | | | 100 | |
| Surlyn ® 8940 | | | | | | | 50 |
| Surlyn ® 9910 | | | | | | | 50 |

"PTMEG" is polytetramethylene ether glycol, having a number average molecular weight of 2,000, and is commercially available from Invista, under the trade name of Terathane® 2000. "BG" is 1,4-butanediol, commercially available from BASF and other suppliers. "TMPME" is trimethylolpropane monoallylether, commercially available from Perstorp Specialty Chemicals AB. "DCP" is dicumyl peroxide, commercially available from LaPorte Chemicals Ltd. Finally, "MDI" is diphenylmethane diisocyanate, commercially available from Huntsman, under the trade name of Suprasec® 1100.

Cover materials C, D, E and F were formed by mixing PTMEG, BG, TMPME, DCP and MDI in the proportions shown. Specifically, these materials were prepared by mixing the components in a high agitated stir for 1 minute, starting at a temperature of about 70 degrees Celsius, followed by a 10-hour post curing process at a temperature of about 100 degrees Celsius. The post cured polyurethane elastomers are ground into small chips.

Cover materials G, H and I are conventional golf ball cover materials. Texin® 245 is trade name of thermoplastic polyurethane resin by Bayer MaterialScience AG. Elastollan® 1195A is trade name of thermoplastic polyurethane resin by BASF. Surlyn® 8940 and Surlyn® 9910 are trade names of ionomeric resin by E.I. DuPont de Nemours and Company.

From the above core materials and cover materials, seven golf balls were manufactured as shown in Table 3. Generally, the golf balls were manufactured using conventional injection molding processes known in the art of golf ball manufacturing.

In each case, the core had a diameter of 39.3 mm, the total golf ball diameter was 42.7 mm, and the golf ball's total weight was 45.4 grams.

TABLE 3

Golf Ball Scuff Resistance

| | Examples | | | Comparative examples | | | |
|---|---|---|---|---|---|---|---|
| | 1 | 2 | 3 | 4 | 5 | 6 | 7 |
| Core - Rubber | A | A | A | A | A | A | B |
| Cover | | | | | | | |
| Resin | C | D | E | F | G | H | I |
| Hardness, Shore D | 53 | 53 | 53 | 53 | 53 | 53 | 69 |
| Scuff resistance | | | | | | | |
| Rating | 2 | 1 | 3 | 4 | 3 | 3 | 4 |

A scuff resistance test was conducted in the following manner: a Nike Victory Red forged standard sand wedge (loft: 54°; bounce: 12°; shaft: True Temper Dynamic Gold shaft; flex: S) is fixed to a swing robot manufactured by Miyamae Co., Ltd. and then swung at the head speed of about 32 m/s. The club face was oriented for a square hit. The forward/backward tee position was adjusted so that the tee was four inches behind the point in the downswing where the club was vertical. The height of the tee and the toe-heel position of the club relative to the tee were adjusted in order that the center of the impact mark was about ¾ of an inch above the sole and was centered toe to heel across the face. Three samples of each ball were tested. Each ball was hit three times.

Other methods may also be used to determine the scuff resistance, such as the methods described in the commonly assigned copending application titled "Golf Ball Wear Indicator", U.S. Patent and Trademark Office Ser. No. 12/691,282, filed Jan. 21, 2010 in the name of Brad Tutmark.

After the above described scuff resistance testing, each golf ball cover was visually observed and rated according to the following scale: a golf ball cover was rated "1" when little or no damage was visible, only groove markings or dents; a golf ball cover was rated "2" when small cuts and/or ripples in the cover were apparent; a golf ball cover was rated "3" when moderate amounts of cover material were lifted from the ball's surface, but the cover material was still attached to the ball; and finally a golf ball cover was rated "4" when cover material was removed or barely attached to the golf ball.

Shore D hardness values of the core and cover layer were measured on the spherical surface of the layer to be measured by using a Shore D hardness tester.

As shown in Table 3, golf ball examples 1 and 2 made from compositions including a crosslinked thermoplastic polyurethane elastomer having crosslinks located in the hard segments, where the crosslinks are the reaction product of unsaturated bonds located in the hard segments as catalyzed by a free radical initiator, provides superior scuff resistance.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A golf ball comprising:
a crosslinked thermoplastic polyurethane elastomer;
the crosslinked thermoplastic polyurethane elastomer including hard segments and soft segments;
wherein the crosslinked thermoplastic polyurethane elastomer includes crosslinks formed from allyl ether side groups, and the crosslinked thermoplastic polyurethane elastomer is the reaction product formed from reacting an organic isocyanate with a mixture of the following reactants:
(a) an unsaturated diol chain extender, wherein the unsaturated diol chain extender has two primary hydroxyl groups and at least one allyl ether side group, of the formula in which R is alkyl group with or without modified functional groups, and x and y are integers of 1 to 4;
(b) a secondary chain extender, having at least two reaction sites with isocyanates and having a molecular weight of less than about 450;
(c) a long chain polyol having a molecular weight of between about 500 and about 4,000; and
(d) a sufficient amount of free radical initiator, so as to be capable of generating free radicals that induce crosslinking structures in the hard segments by free radical initiation.

2. The golf ball of claim 1, wherein
a weight ratio of the crosslinked thermoplastic polyurethane elastomer to the secondary chain extender is about 100:6;
a weight ratio of the crosslinked thermoplastic polyurethane elastomer to the long chain polyol is about 100:44;
a weight ratio of the crosslinked thermoplastic polyurethane elastomer to the organic isocyanate is about 100:39;
a weight ratio of the crosslinked thermoplastic polyurethane elastomer to the free radical initiator is about 100:0.5.

3. The golf ball of claim 1, wherein the free radical initiator is present in the crosslinked thermoplastic polyurethane elastomer in a weight ratio of free radical initiator to unsaturated diols of from about 0.1:100 to about 100:100.

4. The golf ball of claim 3, wherein a weight ratio of the free radical initiator to the unsaturated diols is about 5:100.

5. The golf ball of claim 1, wherein a weight ratio of the crosslinked thermoplastic polyurethane elastomer to the unsaturated diols is from about 100:0.1 to about 100:25.

6. The golf ball of claim 1, wherein a weight ratio of the crosslinked thermoplastic polyurethane elastomer to the unsaturated diols is about 100:10.

7. The golf ball of claim 1, wherein the unsaturated diol is trimethylolpropane monoallylether.

8. The golf ball of claim 1, wherein the free radical initiator generates free radicals through at least one of thermal cleavage and UV radiation.

9. The golf ball of claim 1, wherein the free radical initiator is selected from the group consisting of peroxides, sulfurs, and sulfides.

10. The golf ball of claim 1, wherein the NCO index of the reactants which form the crosslinked thermoplastic polyurethane elastomer is from about 0.9 to about 1.3.

11. The golf ball of claim 1, wherein:
the golf ball comprises a core and a cover layer substantially surrounding the core; and
the cover layer comprises the crosslinked thermoplastic polyurethane elastomer having crosslinks located in the hard segments.

12. The golf ball of claim 1, wherein:
the golf ball comprises a core and a cover layer substantially surrounding the core;
the cover layer comprises an inner cover layer substantially surrounding the core and an outer cover layer substantially surrounding the inner cover layer;
wherein the inner cover layer comprises the crosslinked thermoplastic polyurethane elastomer having crosslinks located in the hard segments.

13. The golf ball of claim 1, wherein:
the golf ball comprises a core and a cover layer substantially surrounding the core;
the cover layer comprises an inner cover layer substantially surrounding the core and an outer cover layer substantially surrounding the inner cover layer;
wherein the outer cover layer comprises the crosslinked thermoplastic polyurethane elastomer having crosslinks located in the hard segments.

14. The golf ball of claim 13, wherein the outer cover layer has a Shore D hardness of between about 20 and about 75.

15. A golf ball comprising: an inner core layer, an outer core layer substantially surrounding the inner core layer, an inner cover layer substantially surrounding the outer core layer, and an outer cover layer substantially surrounding the inner cover layer;
wherein the outer cover layer comprises a crosslinked thermoplastic polyurethane elastomer having crosslinks located in hard segments, the crosslinks being the reaction product of unsaturated of unsaturated bonds located in the hard segments as catalyzed by a free radical initiator; and
the golf ball satisfies the following requirements:
(1) the golf ball has a compression deformation of from about 2 to about 4 millimeters under a load of 10 to 130 kilograms;
(2) the inner core layer has a coefficient of restitution at 40 meters per second from about 0.79 to about 0.92, the coefficient of restitution of the inner core being higher than that of the golf ball;
(3) the outer cover layer has a Shore D hardness from about 20 to about 75; and
(4) the outer cover layer has a flexural modulus of from about 1 kpsi to about 150 kpsi.

16. The golf ball of claim 15, wherein the crosslinked thermoplastic polyurethane elastomer comprises unsaturated diols as chain extenders.

17. The golf ball of claim 16, wherein the weight ratio of the crosslinked thermoplastic polyurethane elastomer to the unsaturated diols is from 100:0.1 to 100:15.

18. The golf ball of claim 15, wherein the free radical initiator is present in the crosslinked thermoplastic polyurethane elastomer in a weight ratio of free radical initiator to unsaturated diols of from about 0.1:100 to about 100:100.

19. The golf ball of claim 15, wherein the crosslinked thermoplastic polyurethane elastomer includes crosslinks formed from allyl ether side groups, and the crosslinked thermoplastic polyurethane elastomer is the reaction product formed from reacting an organic isocyanate with a mixture of the following reactants:

(a) an unsaturated diol chain extender, wherein the unsaturated diol chain extender has two primary hydroxyl groups and at least one allyl ether side group, of the formula in which R is alkyl group with or without modified functional groups, and x and y are integers of 1 to 4;

(b) a secondary chain extender, having at least two reaction sites with isocyanates and having a molecular weight of less than about 450;

(c) a long chain polyol having a molecular weight of between about 500 and about 4,000; and (d) a sufficient amount of free radical initiator, so as to be capable of generating free radicals that induce crosslinking structures in the hard segments by free radical initiation.

20. The golf ball of claim 15, wherein the wherein the unsaturated diol chain extender is trimethylolpropane monoallylether.

21. The golf ball of claim 19, wherein a weight ratio of the crosslinked thermoplastic polyurethane elastomer to the unsaturated diol chain extender is about 100:10.

22. The golf ball of claim 19, wherein
a weight ratio of the crosslinked thermoplastic polyurethane elastomer to the secondary chain extender is about 100:6;
a weight ratio of the crosslinked thermoplastic polyurethane elastomer to the long chain polyol is about 100:44;
a weight ratio of the crosslinked thermoplastic polyurethane elastomer to the organic isocyanate is about 100:39;
a weight ratio of the crosslinked thermoplastic polyurethane elastomer to the free radical initiator is about 100:0.5.

* * * * *